US010140243B2

(12) United States Patent
Mishra et al.

(10) Patent No.: US 10,140,243 B2
(45) Date of Patent: Nov. 27, 2018

(54) ENHANCED SERIAL PERIPHERAL INTERFACE WITH HARDWARE FLOW-CONTROL

(71) Applicant: QUALCOMM Incorporated, San Diego, CA (US)

(72) Inventors: Lalan Jee Mishra, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 15/348,435

(22) Filed: Nov. 10, 2016

(65) Prior Publication Data

US 2017/0168978 A1 Jun. 15, 2017

Related U.S. Application Data

(60) Provisional application No. 62/265,877, filed on Dec. 10, 2015.

(51) Int. Cl.
*G06F 13/42* (2006.01)
*G06F 9/4401* (2018.01)
(Continued)

(52) U.S. Cl.
CPC ........ *G06F 13/4282* (2013.01); *G06F 9/4411* (2013.01); *G06F 13/364* (2013.01); *G06F 13/404* (2013.01)

(58) Field of Classification Search
CPC .... G06F 9/4411; G06F 13/364; G06F 13/404; G06F 13/4282
See application file for complete search history.

(56) References Cited

U.S. PATENT DOCUMENTS 5,933,025 A * 8/1999 Nance .............. H03K 19/00315
326/81
7,171,542 B1 * 1/2007 Alfano ...................... G06F 1/08
712/38
(Continued)

FOREIGN PATENT DOCUMENTS

EP 1553731 A2 7/2005
EP 1901177 A2 3/2008

OTHER PUBLICATIONS

International Search Report and Written Opinion—PCT/US2016/062106—ISA/EPO—dated Feb. 10, 2017.

*Primary Examiner* — Eric T Oberly
(74) *Attorney, Agent, or Firm* — Loza & Loza LLP

(57) ABSTRACT

Systems, methods, and apparatus for implementing hardware flow control between devices coupled through a serial peripheral interface. A method for transmitting information using a serial peripheral interface includes initiating an exchange of data over one or more data lines of a serial peripheral interface bus by asserting a first voltage state on a slave select line, transmitting data and clock signals over the serial peripheral interface bus while the slave select line remains at the first voltage state, refraining from transmitting data and clock signals over the serial peripheral interface bus when the slave select line transitions to a second first voltage state, receiving data at a slave device into a receive buffer while the slave select line remains at the first voltage state, and asserting the second voltage state on the slave select line when occupancy of the receive buffer reaches or exceeds a threshold occupancy level.

26 Claims, 10 Drawing Sheets

(51) Int. Cl.
     *G06F 13/364*   (2006.01)
     *G06F 13/40*    (2006.01)

(56) References Cited

U.S. PATENT DOCUMENTS

| | | |
|---|---|---|
| 7,386,638 B2 | 6/2008 | Voth et al. |
| 7,512,725 B2 | 3/2009 | Odom et al. |
| 7,755,412 B2 | 7/2010 | Thoma |
| 8,732,366 B2 | 5/2014 | Fugate et al. |
| 2002/0120795 A1* | 8/2002 | Charlier .............. G06F 13/4291 710/33 |
| 2003/0028864 A1 | 2/2003 | Bowen |
| 2005/0223141 A1* | 10/2005 | Seto ...................... G06F 13/385 710/57 |
| 2006/0143348 A1 | 6/2006 | Wilson et al. |
| 2008/0010389 A1 | 1/2008 | Iwata |
| 2008/0307126 A1* | 12/2008 | Chou .................. G06F 13/4286 710/52 |

* cited by examiner

ENHANCED SERIAL PERIPHERAL INTERFACE WITH HARDWARE FLOW-CONTROL

CROSS-REFERENCE TO RELATED APPLICATIONS

The present Application for Patent claims priority to Provisional Application No. 62/265,877 that was filed Dec. 10, 2015 and entitled "Enhanced SPI With Hardware-Based Flow Control," which application is assigned to the assignee hereof and hereby expressly incorporated by reference herein.

TECHNICAL FIELD

The present disclosure relates generally to operation of a serial peripheral interface and, more particularly, to implementation of hardware flow control in a serial peripheral interface.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a serial bus. General-purpose serial interfaces are known in the industry, including the serial peripheral interface (SPI), which is commonly included in mobile communication devices to provide synchronous serial communication between a processor and various peripheral devices.

In one example, a SoC operates as an SPI master device coupled through the SPI bus to peripheral devices configured as slave SPI devices. The master device provides a clock signal on a clock line of the SPI bus, where the clock signal controls synchronous serial data exchanges between the master and slave devices. Data may be communicated using two or more data lines of the SPI bus. Since one or more of the data lines may be shared by multiple slave devices, the SPI bus provides a slave select line for each slave device to control access to shared data lines.

Conventional systems that employ an SPI bus may implement software-based flow control, which introduces latency into the communication link Latencies can be problematic in interfaces such as used for a display-overlaid touch interface or systems with an execute in place (XIP) method as implemented through a SPI interface to NOR-FLASH storage. Ever-increasing link throughput and fast-response flow control requirements are increasingly difficult for current SPI interface technologies to satisfy.

As mobile communication devices continue to include a greater level of functionality, improved serial communication techniques are needed to support low-latency transmissions between peripherals and application processors.

SUMMARY

Certain aspects of the disclosure relate to systems, apparatus, methods and techniques that can provide optimized low-latency hardware flow-control for slave devices coupled to a master device using a SPI bus. Hardware flow-control may be implemented without assigning additional pins on the slave devices or the master device.

In various aspects of the disclosure, a method for transmitting information using a serial peripheral interface includes: at a master device, initiating an exchange of data over one or more data lines of a serial peripheral interface bus by asserting a first voltage state on a slave select line; transmitting data and a clock signal from the master device over the serial peripheral interface bus while the slave select line remains at the first voltage state; refraining from transmitting data and the clock signal from the master device over the serial peripheral interface bus when the slave select line transitions to a second first voltage state; receiving data at a slave device into a receive buffer while the slave select line remains at the first voltage state; and asserting, by the slave device, the second voltage state on the slave select line when occupancy of the receive buffer reaches or exceeds a threshold occupancy level.

In some aspects the master device has a first driver circuit configured to drive the slave select line to the first voltage state using a high impedance output, and the slave device has a second driver circuit configured to drive the slave select line to the first voltage state using a low impedance output. Impedances of the first driver circuit and the second driver circuit are selected such that the low impedance output is enabled to drive the slave select line to the second voltage state when the high impedance output is attempting to drive the slave select line to the first voltage state, and vice versa.

In some aspects, asserting the first voltage state on the slave select line includes causing a line driver of the master device to drive the slave select line toward the first voltage state, and causing the line driver of the master device to enter an open-circuited mode of operation when the slave select line achieves the first voltage state. The master device may include a keeper circuit configured to maintain signaling state of the slave select line after the line driver has entered the open-circuited mode of operation.

In one aspect, the method may include using a line driver of the slave device to assert the first voltage state on the slave select line when occupancy of the receive buffer falls below the threshold occupancy level after the slave device has asserted the second voltage state on the slave select line.

In some aspects, the method includes monitoring occupancy of the receive buffer at the slave device, monitoring voltage state of the slave select line, and causing a driver of the slave device to drive the slave select line to the second voltage state when the voltage state of the slave select line is at the first voltage state and the occupancy is at a level that equals or exceeds a threshold occupancy level. The method may include returning the slave select line to the first voltage state after causing the line driver circuit to assert the second voltage state and after the occupancy falls to a level that is less than the threshold occupancy level.

In various aspects of the disclosure, an apparatus has a multi-line serial peripheral interface bus, a master device coupled to the serial peripheral interface bus and a slave device coupled to the serial peripheral interface bus, where the slave device has a receive buffer. The master device may be adapted to assert a first voltage state on a slave select line to initiate an exchange of data over one or more data lines of the serial peripheral interface bus. The master device may be adapted to transmit a clock signal over a clock line of the serial peripheral interface bus while the slave select line remains at the first voltage state. The exchange of data may be synchronized with the clock signal. The master device may be adapted to refrain from transmitting data over the one or more data lines while the slave select line is at a second voltage state. The slave device may be adapted to receive data into the receive buffer while the slave select line remains at the first voltage state, and assert the second voltage state on the slave select line when occupancy of the receive buffer reaches or exceeds a threshold occupancy level.

In some aspects, the master device includes a first driver circuit configured to drive the slave select line to the first voltage state using a high impedance output, and the slave device includes a second driver circuit configured to drive the slave select line to the first voltage state using a low impedance output. Impedances of the first driver circuit and the second driver circuit may be selected such that the low impedance output is enabled to drive the slave select line to the second voltage state when the high impedance output is attempting to drive the slave select line to the first voltage state.

In some aspects, the master device may be adapted to assert the first voltage state by causing a line driver to drive the slave select line toward the first voltage state, and causing the line driver to enter an open-circuited mode of operation when the slave select line achieves the first voltage state. The master device may include a keeper circuit configured to maintain signaling state of the slave select line after the line driver has entered the open-circuited mode of operation.

In one aspect, the slave device is adapted to assert the first voltage state on the slave select line after asserting the second voltage state on the slave select line, and when occupancy of the receive buffer falls below the threshold occupancy level.

In some aspects, the slave device includes a flow control decision circuit configured to monitor occupancy of the receive buffer, monitor voltage state of the slave select line, and cause a line driver circuit to assert the second voltage state on the slave select line when the voltage state of the slave select line is at the first voltage state and the occupancy is at a level that equals or exceeds a threshold occupancy level. The flow control decision circuit may be configured to cause the line driver circuit to return the slave select line to the first voltage state after causing the line driver circuit to assert the second voltage state and after the occupancy falls to a level that is less than the threshold occupancy level.

In various aspects of the disclosure, an apparatus, includes means for asserting a first voltage state on a slave select line of a serial peripheral interface bus, means for transmitting data and a clock signal over the serial peripheral interface bus. The first voltage state may be asserted on the slave select line to initiate an exchange of data over one or more data lines of the serial peripheral interface bus. The means for transmitting the data and the clock signal may be configured to transmit the data from the master device to the slave device while the slave select line remains at the first voltage state, and refrain from transmitting the data from the master device to the slave device when the slave select line transitions to a second voltage state from the first voltage state. The slave device may be configured to receive the data into a receive buffer while the slave select line remains at the first voltage state and assert the second voltage state on the slave select line when occupancy of the receive buffer reaches or exceeds a threshold occupancy level.

In some aspects, the master device may include a first driver circuit configured to drive the slave select line to the first voltage state using a high impedance output, and the slave device may include a second driver circuit configured to drive the slave select line to the first voltage state using a low impedance output. Impedances of the first driver circuit and the second driver circuit may be selected such that the low impedance output is enabled to drive the slave select line to the second voltage state when the high impedance output is attempting to drive the slave select line to the first voltage state.

In some aspects, the means for asserting the first voltage state on the slave select line may be configured to cause a line driver of the master device to drive the slave select line toward the first voltage state, and cause the line driver of the master device to enter an open-circuited mode of operation when the slave select line achieves the first voltage state. The master device may include a keeper circuit configured to maintain signaling state of the slave select line after the line driver has entered the open-circuited mode of operation.

In some aspects, the slave device may be configured to monitor occupancy of the receive buffer at the slave device, monitor voltage state of the slave select line, and drive the slave select line to the second voltage state when the voltage state of the slave select line is at the first voltage state and the occupancy is at a level that equals or exceeds a threshold occupancy level. The means for asserting the first voltage state on the slave select line may be configured to return the slave select line to the first voltage state after the slave device ceases driving the slave select line.

In various aspects, a slave device coupled to a serial peripheral interface has a receiving circuit coupled to a slave select line of a serial peripheral interface, a line driver configured to selectively drive the slave select line of the serial peripheral interface with low impedance, a receive buffer configured to receive data from the serial peripheral interface, and flow control logic. The flow control logic may be configured to monitor an output of the receiving circuit to determine when the slave device is selected for communicating over the serial peripheral interface, monitor occupancy of the receive buffer at the slave device, and cause the line driver to drive the slave select line to a second voltage level when the slave device is selected for communicating and the occupancy of the receive buffer is at a level that equals or exceeds a threshold occupancy level. The slave device may be selected for communicating when the slave select line is at a first voltage level.

In one aspect, the flow control logic may be configured to cause the slave select line to return to the first voltage level after the occupancy of the receive buffer falls to a level that is less than the threshold occupancy level. The line driver may be configured to drive the slave select line to the second voltage level with an output impedance that is lower than an output impedance of a driver used by a master device to drive the slave select line to the first voltage state.

In some aspects, the flow control logic may be adapted to configure the line driver to drive the slave select line with a low impedance when occupancy of the receive buffer is at a level that is less than the threshold occupancy level, and configure the line driver to enter an open-circuited mode of operation when occupancy of the receive buffer is at a level that is less than the threshold occupancy level. The flow control logic may be configured to cause the line driver to drive the slave select line to the first voltage level before entering the open-circuited mode of operation. A keeper circuit may be configured to maintain signaling state of the slave select line after the line driver has entered the open-circuited mode of operation.

In various aspects of the disclosure, a processor-readable storage medium is disclosed. The storage medium may be a non-transitory storage medium and may store code that, when executed by one or more processors, causes the one or more processors to initiate an exchange of data over one or more data lines of a serial peripheral interface bus by asserting a first voltage state on a slave select line, transmit data and a clock signal from the master device over the serial peripheral interface bus while the slave select line remains at the first voltage state, and refrain from transmitting data and the clock signal from the master device over the serial peripheral interface bus when the slave select line transitions to a second voltage state from the first voltage state. Data may be received into a receive buffer at a slave device while the slave select line remains at the first voltage state, and the slave device may be configured to assert the second voltage state on the slave select line when occupancy of the receive buffer reaches or exceeds a threshold occupancy level.

In some aspects, the master device may include a first driver circuit configured to drive the slave select line to the first voltage state using a high impedance output. The slave device may include a second driver circuit configured to drive the slave select line to the first voltage state using a low impedance output. Impedances of the first driver circuit and the second driver circuit may be selected such that the low impedance output is enabled to drive the slave select line to the second voltage state when the high impedance output is attempting to drive the slave select line to the first voltage state.

In some aspects, the first voltage state may be asserted on the slave select line by causing a line driver of the master device to drive the slave select line toward the first voltage state, and causing the line driver of the master device to enter an open-circuited mode of operation when the slave select line achieves the first voltage state. The master device may include a keeper circuit configured to maintain signaling state of the slave select line after the line driver has entered the open-circuited mode of operation.

In some aspects, the slave device may use a line driver to assert the first voltage state on the slave select line when occupancy of the receive buffer falls below the threshold occupancy level after the slave device has asserted the second voltage state on the slave select line. The slave device may be configured to monitor occupancy of the receive buffer at the slave device, monitor voltage state of the slave select line, and drive the slave select line to the second voltage state when the voltage state of the slave select line is at the first voltage state and the occupancy is at a level that equals or exceeds a threshold occupancy level. The slave select line may be returned to the first voltage state after the slave device has asserted the second voltage state and after the occupancy falls to a level that is less than the threshold occupancy level.

DETAILED DESCRIPTION

Figure 1:
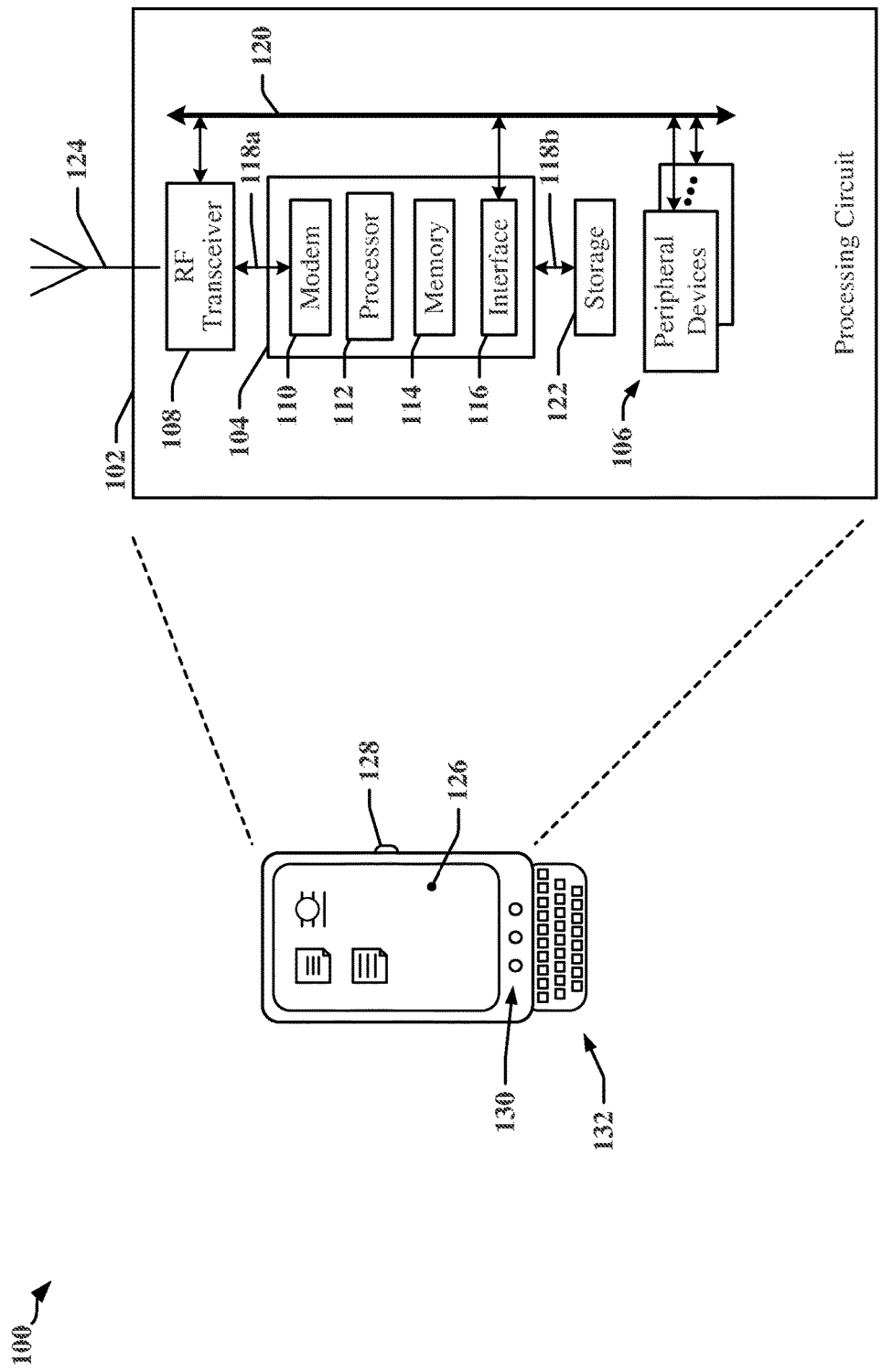
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a serial bus to connect processors with modems and other peripherals. The serial bus may be operated in accordance with multiple protocols defined. In one example, the Serial Peripheral Interface (SPI) may be used to interconnect multiple devices coupled to a bus that supports data and clock signals. A master device selects one of the multiple slave devices using a slave select signal. Point-to-point communication is transacted between the master device and a selected slave device. In various examples, the SPI bus may be configured as a 2-dataline SPI interface or as a 4-dataline quad-serial peripheral interface (QSPI). In the 2-dataline SPI, the data lines are unidirectional, while in the QSPI the data lines may be bidirectional. QSPI can provide higher data rates than the 2-dataline SPI. Both SPI types use a dedicated clock line that fans out to all slaves. Both SPI types use dedicated slave select lines, and a master device provides at least one slave select per slave device to which the master device is coupled.

According to certain aspects disclosed herein, devices coupled to an SPI may be adapted to provide physical link-level hardware flow control without adding pins to the master and slave devices. In some instances, the slave select lines on master and slave devices may be adapted to permit use of the slave select signal to function as a flow-control signal. The techniques are applicable when the slave select line is active low or active high.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include a processing circuit 102 having multiple circuits or devices 104, 106 and/or 108. At least some of the circuits or devices 104, 106 and/or 108 may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that provides an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114 and/or the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, which may be touch-sensitive and may accept user input, a keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with certain communication specifications or protocols. The processing circuit 102 may include or control a power management function that configures and manages the operation of the apparatus 100.

Examples of Serial Peripheral Interfaces

Figure 2:
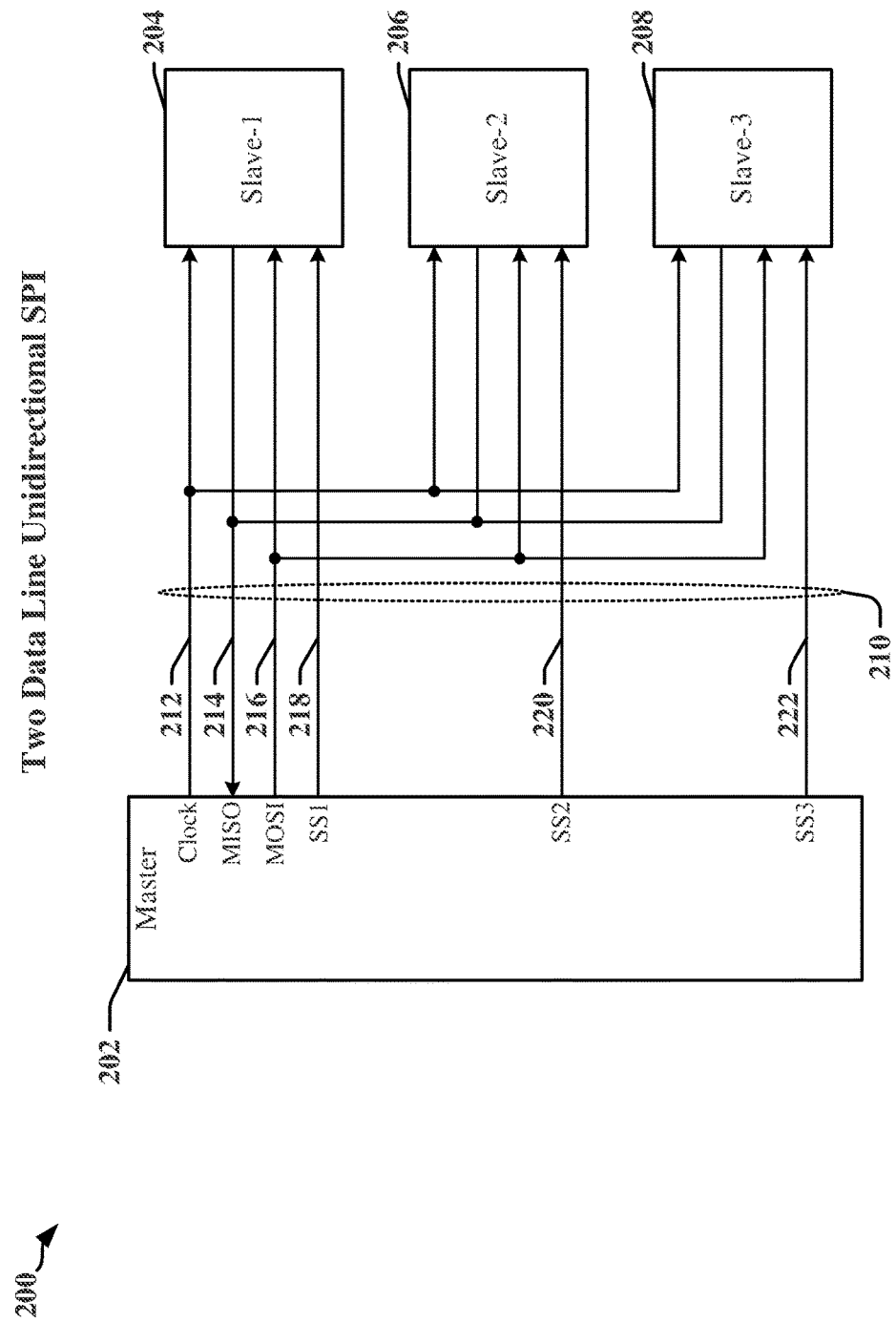
FIG. 2 illustrates certain aspects of a 2-dataline serial peripheral interface that may be adapted according to certain aspects disclosed herein.

FIG. 2 illustrates certain aspects of a 2-dataline SPI 200. A master device 202 may be incorporated in an SoC that serves as an application processor, host processor, or other functional component of an apparatus or system. The master device 202 is coupled to multiple slave devices 204, 206, 208 through a multi-wire bus 210. The master device 202 drives data to the slave devices 204, 206, 208 over a master-out-slave-in line (MOSI line 216) of the multi-wire bus 210. The slave devices 204, 206, 208 may each drive data to the master device 202 over a shared master-in-slave-out line (MISO line 214) of the multi-wire bus 210.

The multi-wire bus 210 includes at least one slave select line 218, 220, 222 for each slave device 204, 206, 208. As illustrated, a first slave select line 218 (SS1) controls bus access by the first slave device 204, a second slave select line 220 (SS2) controls bus access by the second slave device 206, and a third slave select line 222 (SS3) controls bus access by the third slave device 204. The master device 202 may assert a slave select line 218, 220, 222 to cause a corresponding slave device 204, 206, 208 to receive data over the MOSI line 216, and/or to grant permission to the corresponding slave device 204, 206, 208 to transmit on the MISO line 214.

In one example, the slave select lines 218, 220, 222 are not asserted when a low voltage level is applied to the slave select lines 218, 220, 222, and a slave select line 218, 220, 222 is asserted by driving the slave select line 218, 220, 222 to a high voltage level (e.g., towards the power supply level). In another example, the slave select lines 218, 220, 222 are not asserted when a high voltage level (e.g., the power supply level) is applied to the slave select lines 218, 220, 222, and a slave select line 218, 220, 222 is asserted by driving the slave select line 218, 220, 222 to a low voltage level. For each slave select line 218, 220, 222, a driver in the master device 202 may be operated to charge and discharge the slave select line 218, 220, 222 based on assertion state desired for the slave select line 218, 220, 222.

Data is transmitted between the master device 202 and a slave device 204, 206, 208 in accordance with a clock signal provided on a clock line 212 of the multi-wire bus 210. Data signaling is unidirectional on each of the MISO line 214 and MOSI line 216. Data is transferred over the MISO line 214 in a direction opposite to that of data transferred over the MOSI line 216. Data transfers over the MISO line 214 and MOSI line 216 are synchronized to the clock signal provided on the clock line 212.

Figure 3:
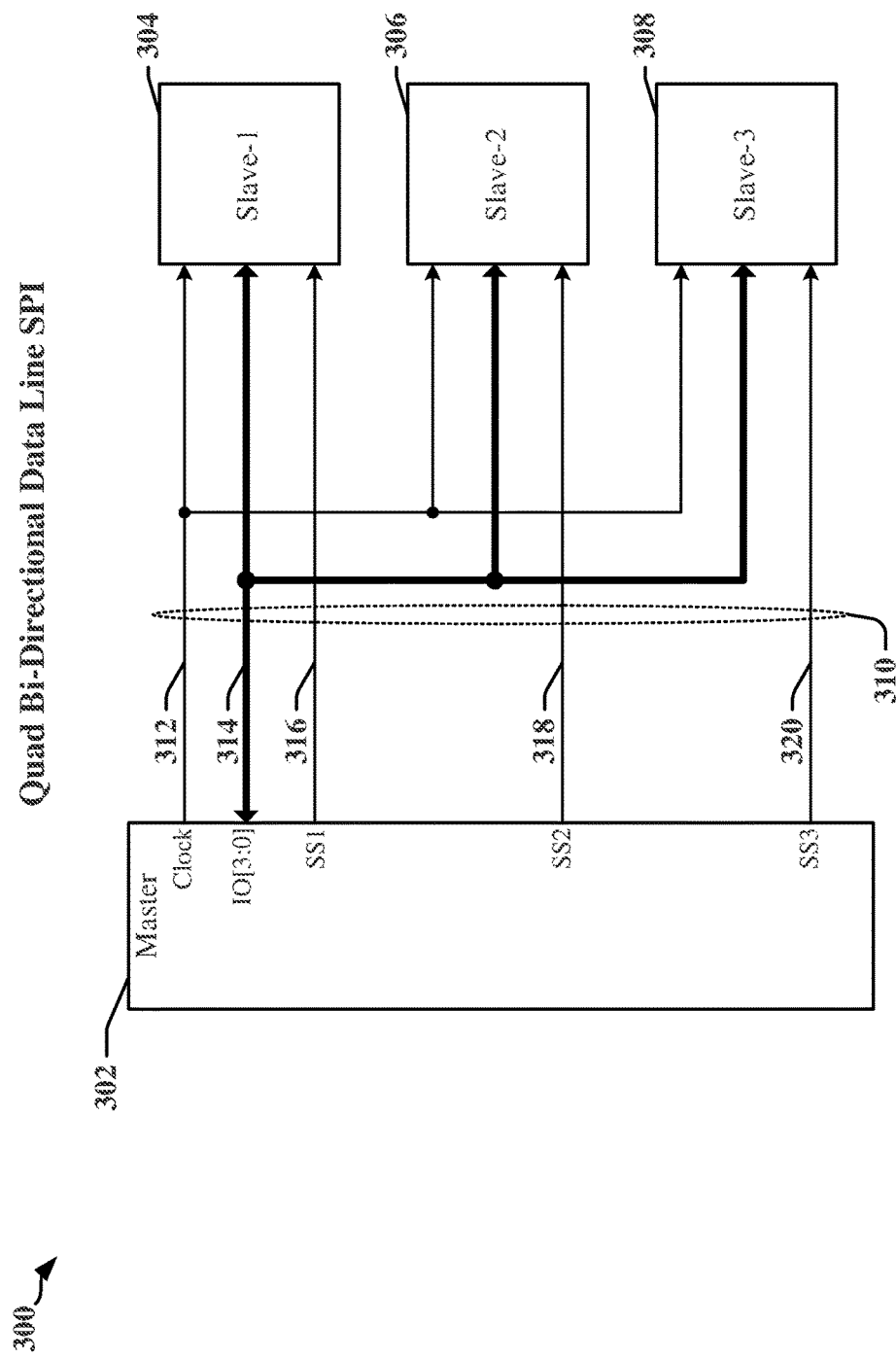
FIG. 3 illustrates certain aspects of a quad-serial peripheral interface that may be adapted according to certain aspects disclosed herein.

FIG. 3 illustrates certain aspects of a quad serial peripheral interface (QSPI) 300. A master device 302 may be incorporated in an SoC that serves as an application processor, host processor, or other functional component of an apparatus or system. The master device 302 is coupled to multiple slave devices 304, 306, 308 through a multi-wire bus 310. The master device 302 exchanges data with the slave devices 304, 306, 308 over a four-wire data channel 314 of the multi-wire bus 310. The four-wire data channel 314 may be employed to provide greater data transfer rates than the two-wire unidirectional signaling scheme illustrated in FIG. 2.

The multi-wire bus 310 includes at least one slave select line for each slave device 304, 306, 308. As illustrated, a first slave select line 316 (SS1) controls bus access by the first slave device 304, a second slave select line 318 (SS2) controls bus access by the second slave device 306, and a third slave select line 320 (SS3) controls bus access by the third slave device 304. The master device 302 may assert a slave select line 316, 318, 320 to cause a corresponding slave device 304, 306, 308 to grant permission to the corresponding slave device 304, 306, 308 to transmit or receive data over the data channel 314.

In one example, the slave select lines 316, 318, 320 are not asserted when a low voltage level is applied to the slave select lines 316, 318, 320, and a slave select line 316, 318, 320 is asserted by driving the slave select line 316, 318, 320 to a high voltage level (e.g., towards the power supply level). In another example, the slave select lines 316, 318, 320 are not asserted when a high voltage level (e.g., the power supply level) is applied to the slave select lines 316, 318, 320, and a slave select line 316, 318, 320 is asserted by driving the slave select line 316, 318, 320 to a low voltage level. For each slave select line 316, 318, 320, a driver in the master device 302 may be operated to charge and discharge the slave select line 316, 318, 320 based on assertion state desired for the slave select line 316, 318, 320.

Data is transmitted between the master device 302 and a slave device 304, 306, 308 in accordance with a clock signal provided on a clock line 312 of the multi-wire bus 310. Data transfers on the data channel 314 are synchronized to the clock signal provided on the clock line 312.

Hardware Flow Control for SPI

SPI master devices and SPI slave devices adapted in accordance with certain aspects disclosed herein may be configured to implement hardware flow control when communicating through an SPI bus. The techniques disclosed herein are applicable to different types of SPI bus, including 2-dataline SPI 200 and QSPI 300. Hardware flow control enables a slave device to indicate readiness to receive data transmitted by a master device 202, 302. For example, a slave device 204, 206, 208, 304, 306, 308 may indicate that it is not ready to receive data when receive buffers on the slave device 204, 206, 208, 304, 306, 308 are full, or have insufficient capacity to receive a newly initiated transmission of data.

Figure 4:
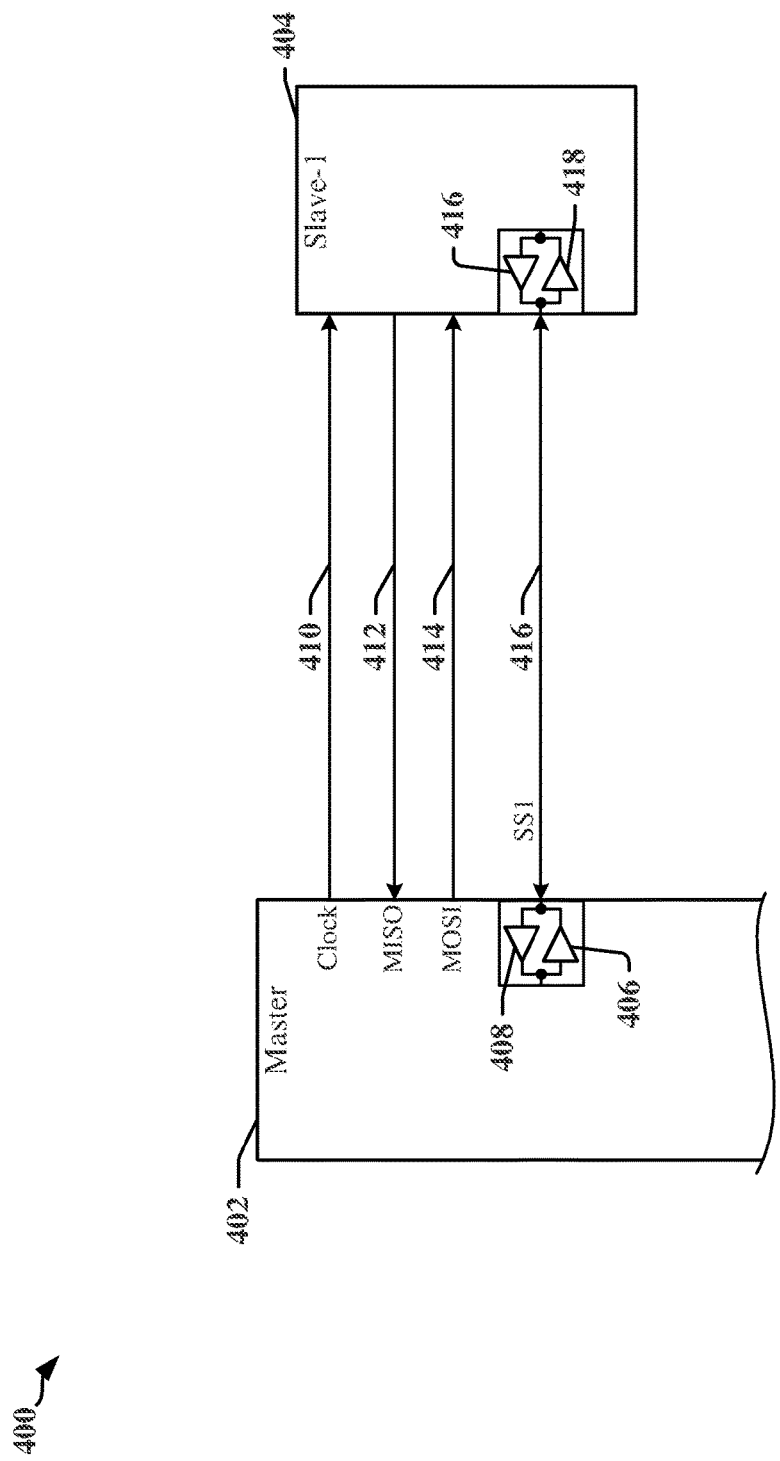
FIG. 4 illustrates a 2-dataline serial peripheral interface adapted to provide hardware flow control in accordance with certain aspects disclosed herein.

FIG. 4 illustrates a 2-dataline SPI 400 that has been adapted according to certain aspects disclosed herein. A master device 402 is coupled to at least one slave device 404. In this example, it is assumed that a slave select line (SS1 line 420) is driven to a high voltage state by the master device 402 to enable the slave device 404 to communicate with the master device 402. In other examples, the SS1 line 420 may be driven to a low voltage state by the master device 402 to enable the slave device 404 to communicate with the master device 402.

The adaptation enables the SS1 line 420 to be driven by both the master device 402 and the corresponding slave device 404. The master device 402 transmits data to the slave device 404 over a master-out-slave-in line (MOSI line 414). The slave device 404 may drive data to the master device 402 over a shared master-in-slave-out line (MISO line 412), when enabled by the signaling state on the SS1 line 420. The master device 402 may assert an enable signaling state on the SS1 line 420 to permit the slave device 404 to transmit and/or receive data. Data is transmitted between the master device 402 and the slave device 404 in accordance with a clock signal provided on a clock line 410.

In a read or write operation involving the slave device 404, the master device 402 drives the SS1 line 420 to a high voltage state to select the slave device 404. The SS1 line 420 is driven by the master device 402 using a driver 406 with high output impedance. The slave device 404 may be adapted to both read and drive the SS1 line 420. The slave device 404 may include a receiver 418 configured to detect the signaling state of the SS1 line 420. The slave device 404 may assert flow control by driving the SS1 line 420 to a low voltage state using a line driver 416 with low output impedance. The master device 402 includes a line receiver 408 configured to read the signaling state of the SS1 line 420. The master device 402 may respond to a low voltage state asserted by the slave device 404 by ceasing transmission of data to the slave device 404.

Figure 5:
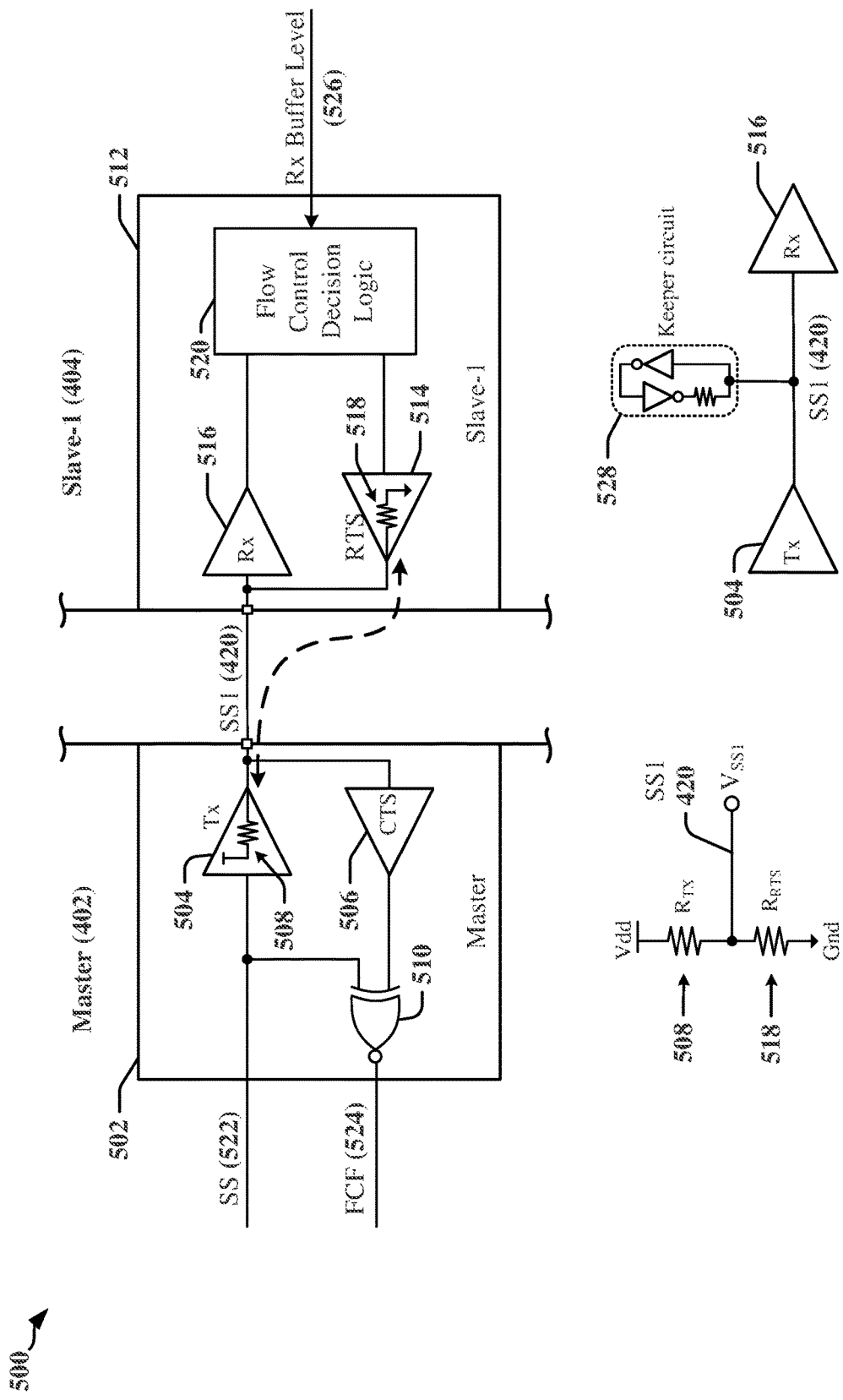
FIG. 5 illustrates an example of line driving circuits that may be used to provide hardware flow control in accordance with certain aspects disclosed herein.

FIG. 5 illustrates an example 500 of line interface circuits 502, 512 that may be used to drive the SS1 line 420 in accordance with certain aspects disclosed herein. The SS1 line 420 may be driven simultaneously by both the master device 402 and the slave device 404 when the slave device 404 wishes to assert flow control. A line interface circuit 502 in the master device 402 includes a line driver (Tx driver 504) that has a high impedance output and that weakly asserts the SS1 line 420, regardless of whether assertion is to the high or low voltage state. A line interface circuit 512 in the slave device 404 includes a line driver (RTS driver 514) that has a low impedance output that can overcome the weak assertion of the SS1 line 420 by the master device 402.

The Tx driver 504 in the master device 402 presents an output impedance illustrated as a resistor 508 having a value $R_{TX}$. The RTS driver 514 of the slave device 404 presents an output impedance illustrated as a resistor 518 having a value $R_{RTS}$. The voltage $V_{SS1}$ observed on the SS1 line 420 is determined by a relationship between the resistors 508, 518 ($R_{TX}$ and $R_{RTS}$). For example, when the resistor 508 of the Tx driver 504 is coupled to a voltage of $V_{dd}$, the voltage $V_{RX}$ observed on the SS1 line 420 may be calculated as:

$$V_{SS1} = \frac{R_{RTS}}{R_{RX} + R_{RTS}} \times V_{DD} \qquad \text{Eq. 1}$$

In some implementations, the drivers 504, 514 may be placed in a high impedance state after asserting a voltage state on the SS1 line 420. A keeper circuit 528 may be coupled to the SS1 line 420 to maintain the last asserted voltage on the SS1 line 420. The keeper circuit 528 is easily overcome by both the Tx driver 504 and the RTS driver 514. In these implementations the Tx driver 504 asserts an enabling state on the SS1 line 420 before releasing the SS1 line 420. For example, the enabling state may be a logic 1 state (represented by high or low voltage), and the keeper circuit 528 holds the logic 1 state until one of the drivers 504, 514 changes the state of the SS1 line 420. The slave device 404 may cause the RTS driver 514 to change the state of the SS1 line 420 when receive buffers are filled to capacity or are close to capacity.

The slave device 404 may include flow control decision logic 520 that receives the current signaling state of the SS1 line 420, and a Rx_Buffer_Level input 526 that indicates, for example, whether receive buffers in the slave device 404 have reached or exceeded a buffer threshold identifying maximum occupancy level. If the buffer threshold has been reached, the slave device 404 may cause the RTS driver 514 to drive the SS1 line 420 to the logic 0 state from a logic 1 state (i.e., when the slave device 404 has been enabled by the master device 402). The RTS driver 514 employs a low impedance driver that can overcome the typical logic 1 driven by master device 402. When the master device has asserted its internal enable signal (SS 522) for the slave device 404, the overridden value of the SS1 line 420 causes the output (FCF 524) of the Exclusive-NOR logic gate 510 in the master device 402 to assume a value of logic 0, indicating that the slave device 404 is not ready to receive. When the SS1 line 420 is at the logic 1 level, FCF 524 is at logic 1 indicating that the slave device 404 is ready to receive data. When the slave device 404 is not selected, SS 522 is not asserted, SS1 420 is normally high and FCF has a value of logic 0, indicating that the slave device 404 is not ready. The slave device 404 can signal a request to send by overriding the SS1 high state, causing FCF to transition to logic 0, indicating that the slave device 404 is ready.

The flow control decision logic 520 may comprise a state machine, sequencer, or another suitable logic circuit configured to monitor the state of the SS1 line 420 and the Rx_Buffer_Level input 526, and to implement the impedance-based flow control procedures and protocols disclosed herein. In some instances, the flow control decision logic 520 may be implemented using a processor, or some combination of a processor and logic circuits. The slave device 404 may be able to control the output impedance of the RTS driver 514. In some examples, the slave device 404 may enable the RTS driver 514 when necessary to indicate not-ready status and may disable the RTS driver 514 when the slave device 404 is ready. In the latter example, the SS1 line 420 is pulled to the voltage representing logic 1 state by the internal resistor 508 of the Tx driver 504, or by the keeper circuit 528.

The keeper circuit 528 may be provided in the master device 402 and/or in the slave device 404. In some instances, the keeper circuit 528 may be controlled by the master device 402 or a slave device 404 such that the master device 402 or the slave device 404 may force a state change on the SS1 line 420. For example, the flow control decision logic 520 may signal the keeper circuit 528 to drive the SS1 line 420 to a high state when the SS1 line 420 is in a low state, and/or the flow control decision logic 520 may signal the keeper circuit 528 to drive the SS1 line 420 to the low state when the SS1 line 420 is in the high state.

The master device 402 may refrain from transmitting data on the MOSI line 414 while the FCF output signal 524 is at logic 0. The master device 402 may stop data transmissions by halting, slowing or gating the clock signal transmitted on the clock line 410. A ready-to-receive state may be determined when the inputs to the Exclusive-NOR logic gate 510 have the same asserted state. The FCF output signal 524 is thus asserted high to a binary one state to signify that slave device 404 is ready to receive data.

The master device 402 and the slave device 404 may include additional logic and circuits to implement flow control. In one example, the master device 402 may include a line receiver (CTS receiver 506) configured to monitor the signaling state of the SS1 line 420, which may differ from the state asserted on SS 522. In another example, the slave device 404 may include a line receiver (Rx receiver 516) configured to monitor the signaling state of the SS1 line 420, which may differ from the state asserted by the slave device 404 through the RTS driver 514.

As discussed in relation to the examples in FIGS. 4 and 5, hardware flow control may be implemented in devices where the SS1 line 420 carries a slave select signal that enables a device when the SS1 line 420 is in the high voltage state, or in devices where the SS1 line 420 carries a slave select signal that enables a device when the SS1 line 420 is in the low voltage state. The principles disclosed herein can be implemented using any assignment of logic levels to signaling states on the SS1 line 420 and/or within the master device 402 or slave device 404. For the purposes of the following flowcharts, it may be assumed that a logic 1 is represented by a high voltage level (e.g. Vdd or power supply voltage level), and that a logic 0 is represented by a low voltage level (e.g. 0 volts or power supply ground).

Figure 6:
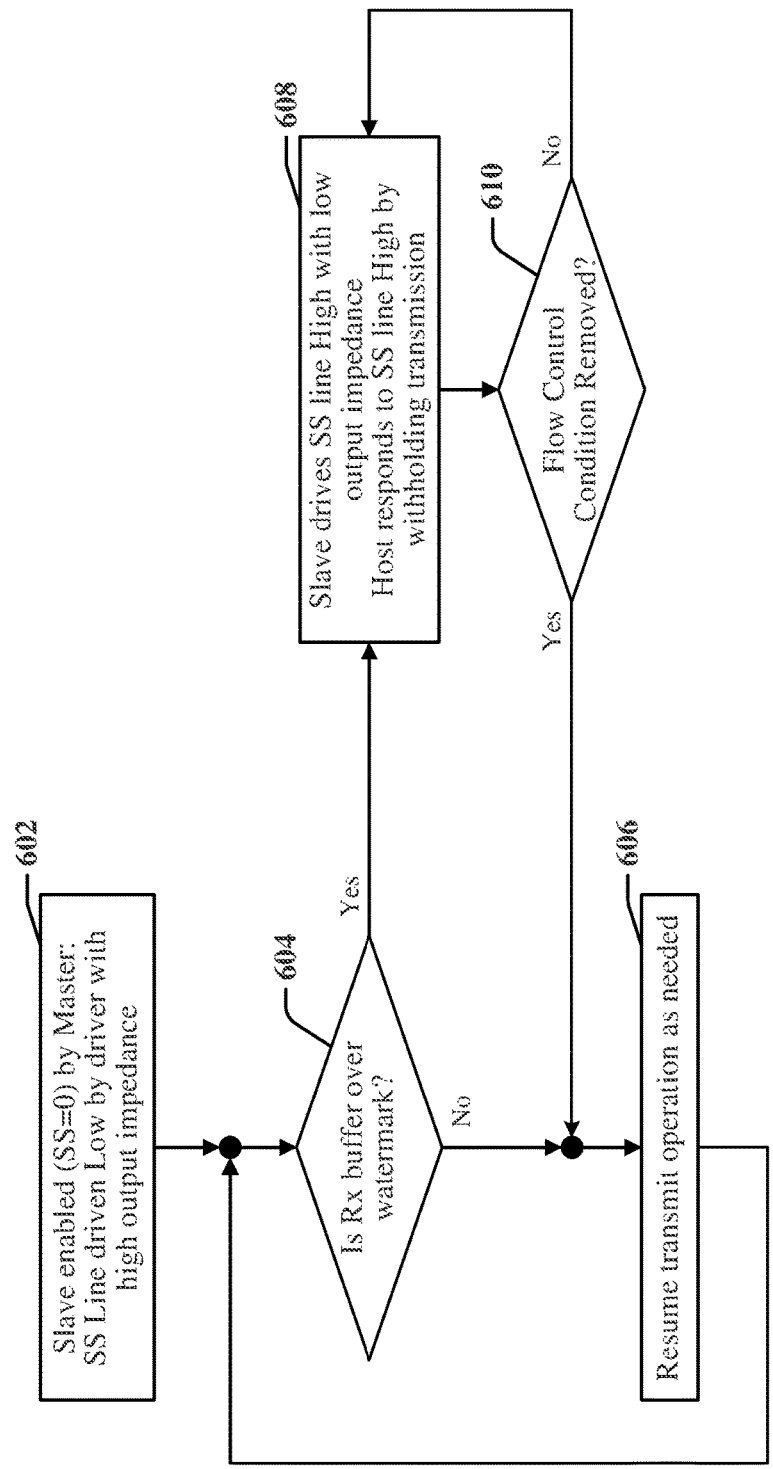
FIG. 6 illustrates a first example of flow control that may be implemented in accordance with certain aspects disclosed herein.

FIG. 6 illustrates an example of flow control 600 that may be implemented by a state machine, sequencer logic and/or by a processor. In this example, a slave device 404 is enabled for communication on a SPI bus when the SS1 line 420 is set to logic 0, which may be represented by a low voltage level.

At block 602, the master device 402 may cause its Tx driver 504 to drive the SS1 line 420 for a corresponding slave device 404 to the logic 0 state using a high resistance-value output resistor 508. Logic 0 may be represented as ground voltage level. The logic 0 state may be detected by flow control decision logic 520 through the Rx receiver 516. At block 604, the flow control decision logic 520 may determine the state of the receive buffer in the slave device 404 based on the state of the Rx_Buffer_Level input 526. If the receive buffer in the slave device 404 is below a first threshold occupancy level (e.g., a watermark threshold), then the slave device 404 may receive data at block 606. The flow control decision logic 520 continues to monitor the Rx_Buffer_Level input 526. At some point, the flow control decision logic 520 may determine at block 604 that the receive buffer in the slave device 404 has reached or exceeded the first threshold occupancy level, and may proceed to block 608 to assert flow control.

At block 608, the flow control decision logic 520 causes the RTS driver 514 to drive the SS1 line 420 to the logic 1 state using a low resistance-value output resistor 518. Logic 1 may be represented as the power supply voltage. The master device 402 may halt data transmissions. The flow control decision logic 520 continues to monitor the Rx_Buffer_Level input 526. At some point, the flow control decision logic 520 may determine at block 610 that the receive buffer in the slave device 404 has fallen below a second threshold occupancy level, and may disable the RTS driver 514 or otherwise cause the SS1 line 420 to return to the logic 0 state, before continuing reception of data at block 606. The second threshold occupancy level may have the same value as the first threshold occupancy act 315 or may have a different value from the first threshold occupancy.

Figure 7:
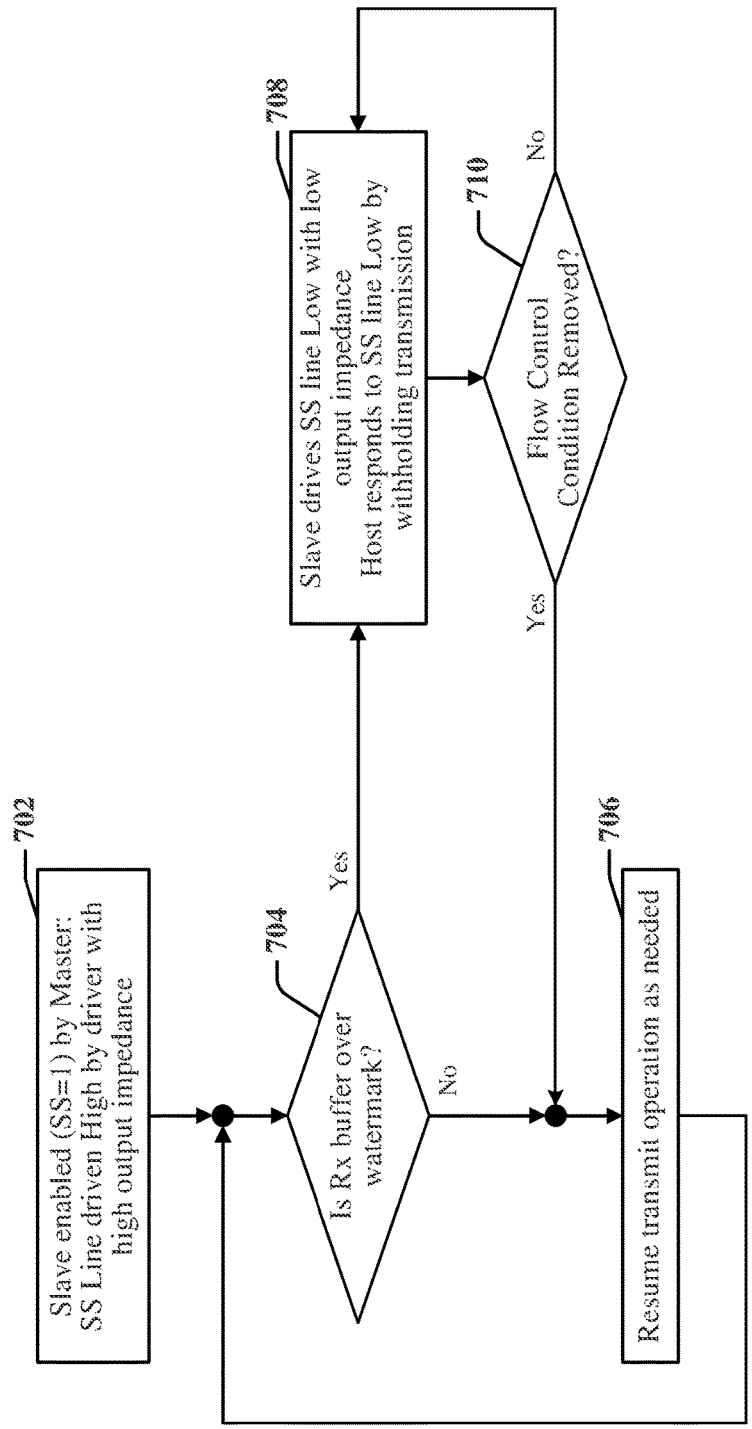
FIG. 7 illustrates a second example of flow control that may be implemented in accordance with certain aspects disclosed herein

FIG. 7 illustrates an example of flow control 700 that may be implemented by a state machine, sequencer logic and/or by a processor. In this example, a slave device 404 is enabled for communication on a SPI bus when the SS1 line 420 is set to logic 1, which may be represented as a high voltage level.

At block 702, the master device 402 may cause its Tx driver 504 to drive the SS1 line 420 for a corresponding slave device 404 to the logic 1 state using a high resistance-value output resistor 508. Logic 1 may be represented as power supply voltage. The logic 1 state may be detected by flow control decision logic 520 through the Rx receiver 516. At block 704, the flow control decision logic 520 may determine the state of the receive buffer in the slave device 404 based on the state of the Rx_Buffer_Level input 526. If the receive buffer in the slave device 404 is below a first threshold occupancy level (e.g., a watermark threshold), then the slave device 404 may receive data at block 706. The flow control decision logic 520 continues to monitor the Rx_Buffer_Level input 526. At some point, the flow control decision logic 520 may determine at block 704 that the receive buffer in the slave device 404 has reached or exceeded the first threshold occupancy level, and may proceed to block 708 to assert flow control.

At block 708, the flow control decision logic 520 causes the RTS driver 514 to drive the SS1 line 420 to the logic 0 state using a low resistance-value output resistor 518. Logic 0 may be represented as the ground voltage level. The master device 402 may halt data transmissions. The flow control decision logic 520 continues to monitor the Rx_Buffer_Level input 526. At some point, the flow control decision logic 520 may determine at block 710 that the receive buffer in the slave device 404 has fallen below a second threshold occupancy level, and may disable the RTS driver 514 or otherwise cause the SS1 line 420 to return to the logic 1 state, before continuing reception of data at block 706. The second threshold occupancy level may have the same value as the first threshold occupancy level, or may have a different value from the first threshold occupancy level.

Examples of Processing Circuits and Methods

Figure 8:
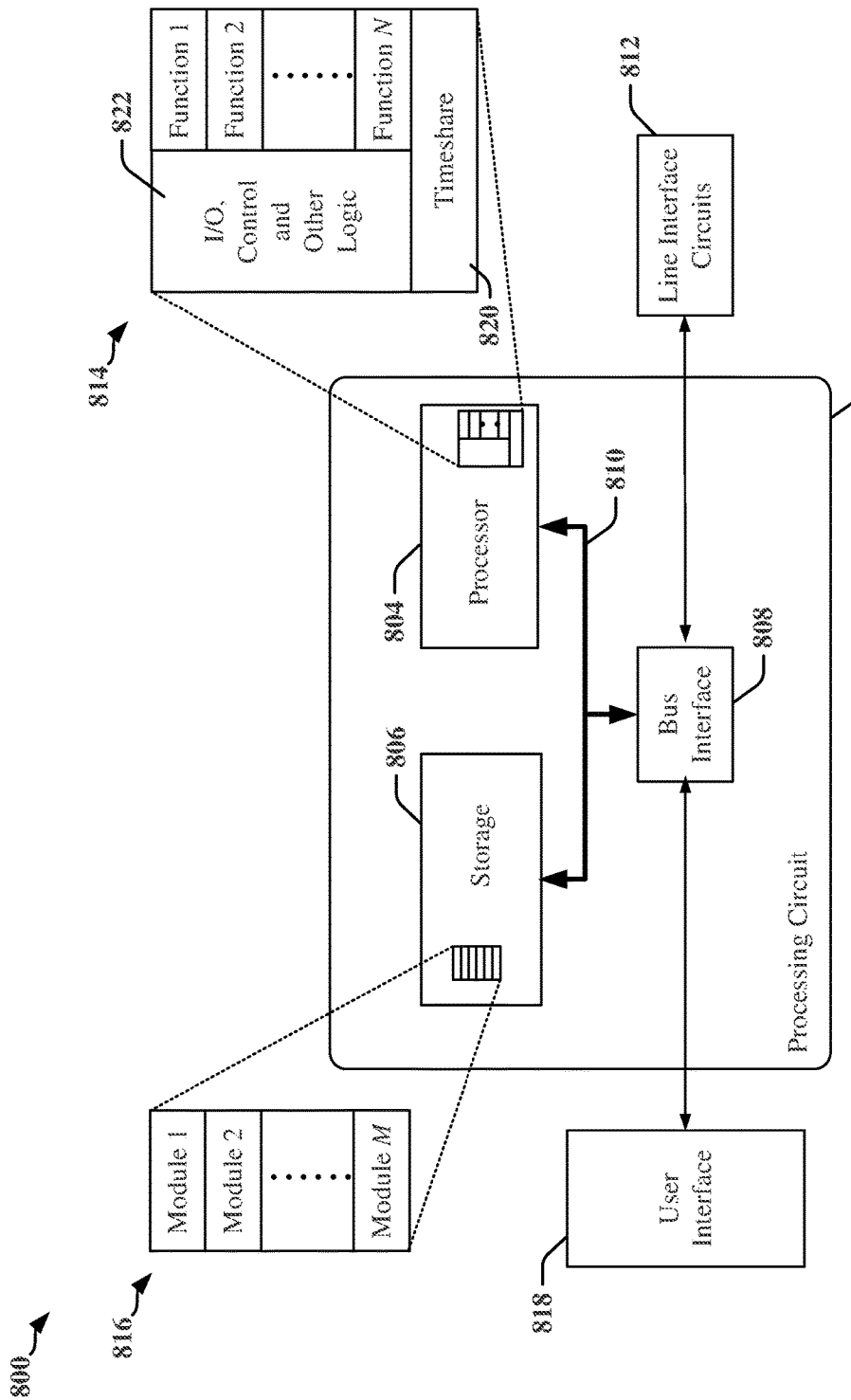
FIG. 8 illustrates one example of an apparatus employing a processing circuit that may be adapted according to certain aspects disclosed herein.

FIG. 8 is a diagram illustrating an example of a hardware implementation for an apparatus 800 employing an SPI bus. In some examples, the apparatus 800 may perform one or more functions disclosed herein. In accordance with various aspects of the disclosure, an element, or any portion of an element, or any combination of elements as disclosed herein may be implemented using a processing circuit 802. The processing circuit 802 may include one or more processors 804 that are controlled by some combination of hardware and software modules. Examples of processors 804 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 804 may include specialized processors that perform specific functions, and that may be configured, augmented or controlled by one of the software modules 816. The one or more processors 804 may be configured through a combination of software modules 816 loaded during initialization, and further configured by loading or unloading one or more software modules 816 during operation.

In the illustrated example, the processing circuit 802 may be implemented with a bus architecture, represented generally by the bus 810. The bus 810 may include any number of interconnecting buses and bridges depending on the specific application of the processing circuit 802 and the overall design constraints. The bus 810 links together various circuits including the one or more processors 804, and storage 806. Storage 806 may include memory devices and mass storage devices, and may be referred to herein as computer-readable media and/or processor-readable media. The bus 810 may also link various other circuits such as timing sources, timers, peripherals, voltage regulators, and power management circuits. A bus interface 808 may provide an interface between the bus 810 and one or more transceivers 812. A transceiver 812 may be provided for each networking technology supported by the processing circuit. In some instances, multiple networking technologies may share some or all of the circuitry or processing modules found in a transceiver 812. Each transceiver 812 provides a means for communicating with various other apparatus over a transmission medium. Depending upon the nature of the apparatus 800, a user interface 818 (e.g., keypad, display, speaker, microphone, joystick) may also be provided, and may be communicatively coupled to the bus 810 directly or through the bus interface 808.

A processor 804 may be responsible for managing the bus 810 and for general processing that may include the execution of software stored in a computer-readable medium that may include the storage 806. In this respect, the processing circuit 802, including the processor 804, may be used to implement any of the methods, functions and techniques disclosed herein. The storage 806 may be used for storing data that is manipulated by the processor 804 when executing software, and the software may be configured to implement any one of the methods disclosed herein.

One or more processors 804 in the processing circuit 802 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 806 or in an external computer-readable medium. The external computer-readable medium and/or storage 806 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 806 may also include, by way of example, a carrier wave, a transmission line, and any other suitable medium for transmitting software and/or instructions that may be accessed and read by a computer. Computer-readable medium and/or the storage 806 may reside in the processing circuit 802, in the processor 804, external to the processing circuit 802, or be distributed across multiple entities including the processing circuit 802. The computer-readable medium and/or storage 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 806 may maintain software maintained and/or organized in loadable code segments, modules, applications, programs, etc., which may be referred to herein as software modules 816. Each of the software modules 816 may include instructions and data that, when installed or loaded on the processing circuit 802 and executed by the one or more processors 804, contribute to a run-time image 814 that controls the operation of the one or more processors 804. When executed, certain instructions may cause the processing circuit 802 to perform functions in accordance with certain methods, algorithms and processes described herein.

Some of the software modules 816 may be loaded during initialization of the processing circuit 802, and these software modules 816 may configure the processing circuit 802 to enable performance of the various functions disclosed herein. For example, some software modules 816 may configure internal devices and/or logic circuits 822 of the processor 804, and may manage access to external devices such as the transceiver 812, the bus interface 808, the user interface 818, timers, mathematical coprocessors, and so on. The software modules 816 may include a control program and/or an operating system that interacts with interrupt handlers and device drivers, and that controls access to various resources provided by the processing circuit 802. The resources may include memory, processing time, access to the transceiver 812, the user interface 818, and so on.

One or more processors 804 of the processing circuit 802 may be multifunctional, whereby some of the software modules 816 are loaded and configured to perform different functions or different instances of the same function. The one or more processors 804 may additionally be adapted to manage background tasks initiated in response to inputs from the user interface 818, the transceiver 812, and device drivers, for example. To support the performance of multiple functions, the one or more processors 804 may be configured to provide a multitasking environment, whereby each of a plurality of functions is implemented as a set of tasks serviced by the one or more processors 804 as needed or desired. In one example, the multitasking environment may be implemented using a timesharing program 820 that passes control of a processor 804 between different tasks, whereby each task returns control of the one or more processors 804 to the timesharing program 820 upon completion of any outstanding operations and/or in response to an input such as an interrupt. When a task has control of the one or more processors 804, the processing circuit is effectively specialized for the purposes addressed by the function associated with the controlling task. The timesharing program 820 may include an operating system, a main loop that transfers control on a round-robin basis, a function that allocates control of the one or more processors 804 in accordance with a prioritization of the functions, and/or an interrupt driven main loop that responds to external events by providing control of the one or more processors 804 to a handling function.

Figure 9:
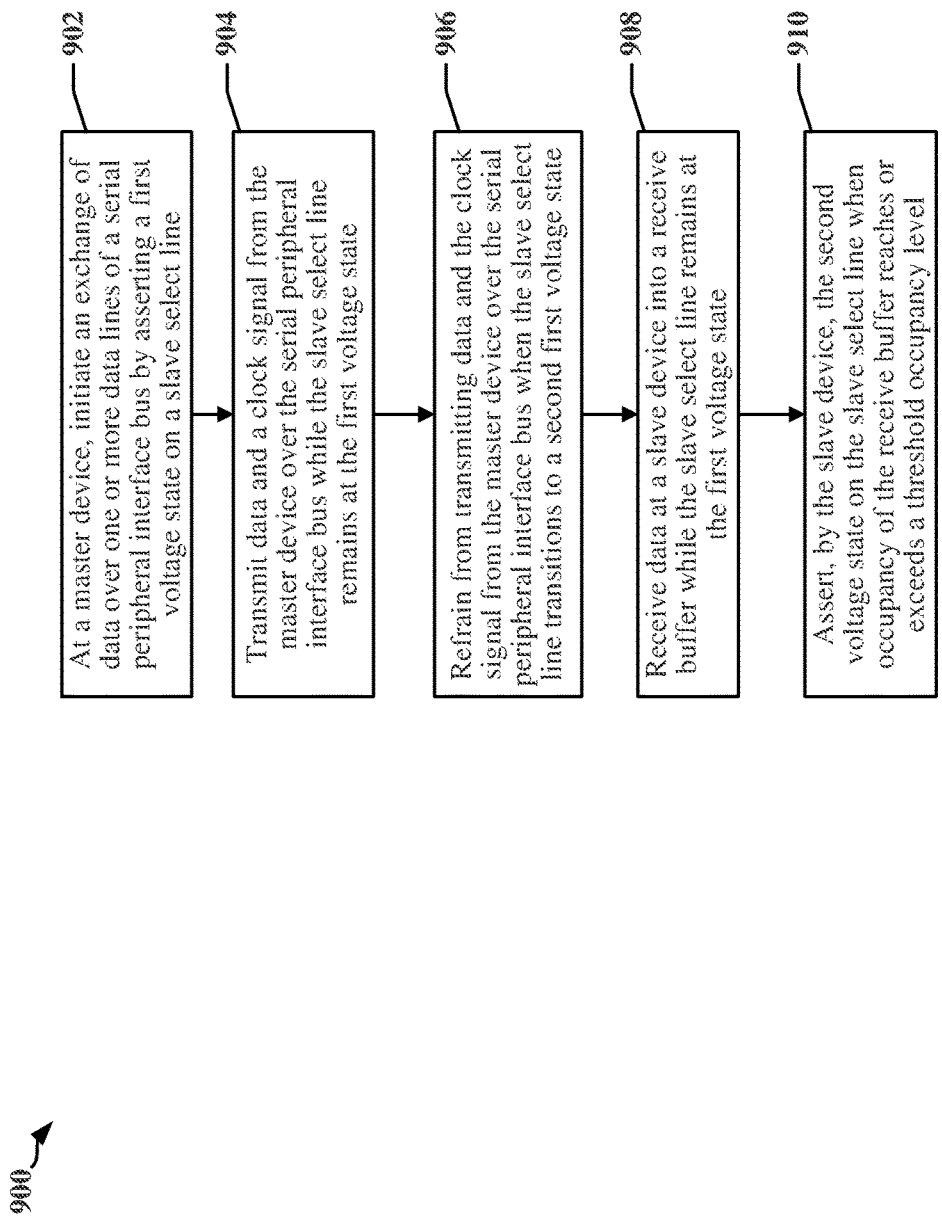
FIG. 9 is a flowchart illustrating certain operations of an application processor adapted to cause slave devices to obtain multiple dynamic addresses in accordance with certain aspects disclosed herein.

FIG. 9 is a flowchart 900 of a method for exchanging information using a serial peripheral interface. At block 902, a master device 402 may initiate an exchange of data over one or more data lines of a serial peripheral interface bus by asserting a first voltage state on a slave select line.

At block 904, while the slave select line remains at the first voltage state, the master device 402 may transmit data and a clock signal over the serial peripheral interface bus.

At block 906, the master device 402 may refrain from transmitting data and the clock signal over the serial peripheral interface bus when the slave select line transitions to a second first voltage state.

At block 908, a slave device 404 may receive data into a receive buffer while the slave select line remains at the first voltage state.

At block 910, the slave device 404 may assert the second voltage state on the slave select line when occupancy of the receive buffer reaches or exceeds a threshold occupancy level.

In some examples, the master device 402 may include a first driver circuit configured to drive the slave select line to the first voltage state using a high impedance output. The slave device 404 may include a second driver circuit configured to drive the slave select line to the first voltage state using a low impedance output. Impedances of the first driver circuit and the second driver circuit may be selected such that the low impedance output is enabled to drive the slave select line to the second voltage state when the high impedance output is attempting to drive the slave select line to the first voltage state.

In some examples, asserting the first voltage state on the slave select line includes causing a line driver of the master device 402 to drive the slave select line toward the first voltage state, and causing the line driver of the master device 402 to enter an open-circuited mode of operation when the slave select line achieves the first voltage state. The master device 402 and/or the slave device 404 may include a keeper circuit 528 configured to maintain signaling state of the slave select line after the line driver has entered the open-circuited mode of operation.

In one example, a line driver of the slave device 404 may be used to assert the first voltage state on the slave select line when occupancy of the receive buffer falls below the threshold occupancy level after the slave device 404 has asserted the second voltage state on the slave select line.

In some examples, the slave device 404 may monitor occupancy of the receive buffer, monitor voltage state of the slave select line, and cause a driver of the slave device 404 to drive the slave select line to the second voltage state when the voltage state of the slave select line is at the first voltage state and the occupancy is at a level that equals or exceeds a threshold occupancy level. The slave device 404 may return the slave select line to the first voltage state after causing the line driver circuit to assert the second voltage state and after the occupancy falls to a level that is less than the threshold occupancy level.

Figure 10:
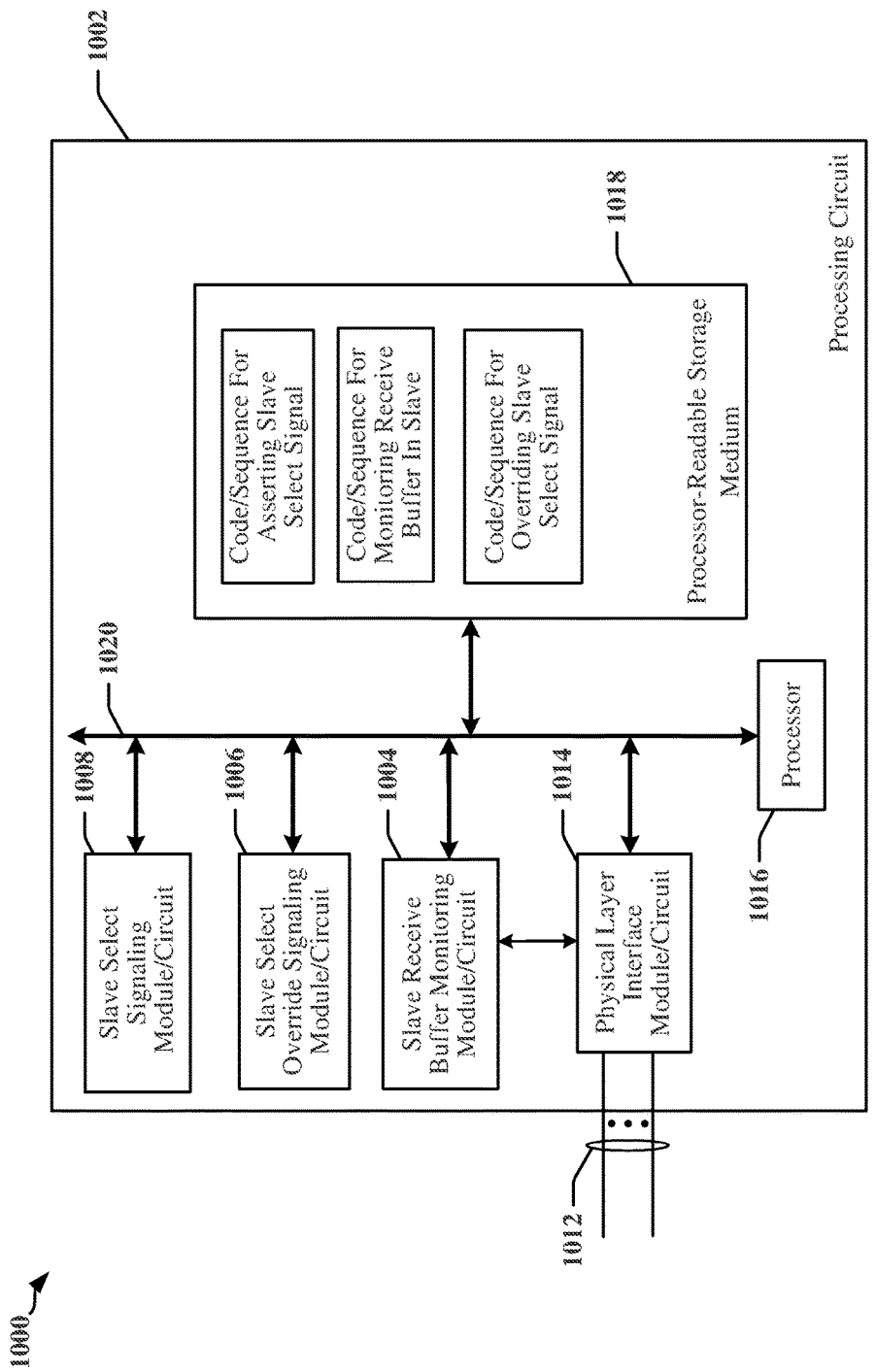
FIG. 10 illustrates a first example of a hardware implementation for an apparatus adapted to respond to multiple dynamic addresses in accordance with certain aspects disclosed herein.

FIG. 10 is a diagram illustrating a simplified example of a hardware implementation for an apparatus 1000 employing a processing circuit 1002. The apparatus may implement a bridging circuit in accordance with certain aspects disclosed herein. The processing circuit typically has a controller or processor 1016 that may include one or more microprocessors, microcontrollers, digital signal processors, sequencers and/or state machines. The processing circuit 1002 may be implemented with a bus architecture, represented generally by the bus 1020. The bus 1020 may include any number of interconnecting buses and bridges depending on the specific application of the processing circuit 1002 and the overall design constraints. The bus 1020 links together various circuits including one or more processors and/or hardware modules, represented by the controller or processor 1016, the modules or circuits 1004, 1006 and 1008, and the computer-readable storage medium 1018. The apparatus may be coupled to a multi-wire communication link using a physical layer circuit 1014. The physical layer circuit 1014 may operate the multi-wire communication link as a serial peripheral interface bus 1012. The bus 1020 may also link various other circuits such as timing sources, peripherals, voltage regulators, and power management circuits, which are well known in the art, and therefore, will not be described any further.

The processor 1016 is responsible for general processing, including the execution of software, code and/or instructions stored on the computer-readable storage medium 1018. The computer-readable storage medium may include a non-transitory storage medium. The software, when executed by the processor 1016, causes the processing circuit 1002 to perform the various functions described supra for any particular apparatus. The computer-readable storage medium may be used for storing data that is manipulated by the processor 1016 when executing software. The processing circuit 1002 further includes at least one of the modules 1004, 1006 and 1008. The modules 1004, 1006 and 1008 may be software modules running in the processor 1016, resident/stored in the computer-readable storage medium 1018, one or more hardware modules coupled to the processor 1016, or some combination thereof. The modules 1004, 1006 and 1008 may include microcontroller instructions, state machine configuration parameters, or some combination thereof.

In one configuration, the apparatus 1000 includes modules and/or circuits 1008 configured to assert a first voltage state on a slave select line to initiate an exchange of data over one or more data lines of a serial peripheral interface bus 1012. The apparatus 1000 may include modules and/or circuits 1006 configured to monitor occupancy of a receive buffer, and modules and/or circuits 1008 configured to assert a second voltage state on the slave select line when occupancy of the receive buffer reaches or exceeds a threshold occupancy level.

In various examples, the apparatus 1000 may be deployed in a master device 402 and/or a slave device 404 coupled to a serial peripheral interface bus 1012. In one example, a master device 402 coupled to the serial peripheral interface bus 1012 may be adapted to assert a first voltage state on a slave select line to initiate an exchange of data over one or more data lines of the serial peripheral interface bus 1012, and transmit a clock signal over a clock line of the serial peripheral interface bus 1012, while the slave select line remains at the first voltage state. The exchange of data may be synchronized with the clock signal. The master device 402 may be further adapted to refrain from transmitting data over the one or more data lines while the slave select line is at a second voltage state. the master device 402 is adapted to assert the first voltage state by: causing a line driver to drive the slave select line toward the first voltage state, and causing the line driver to enter an open-circuited mode of operation when the slave select line achieves the first voltage state. The master device 402 may include or be coupled to a keeper circuit 528 configured to maintain signaling state of the slave select line after the line driver has entered the open-circuited mode of operation.

In another example, a slave device 404 coupled to the serial peripheral interface bus 1012 may include a receive buffer and be adapted to receive data into the receive buffer while the slave select line remains at the first voltage state. The slave device 404 may be adapted to assert the second voltage state on the slave select line when occupancy of the receive buffer reaches or exceeds a threshold occupancy level.

A master device 402 may have a first driver circuit configured to drive the slave select line to the first voltage state using a high impedance output and a slave device 404 may have a second driver circuit configured to drive the slave select line to the first voltage state using a low impedance output. Impedances of the first driver circuit and the second driver circuit may be selected such that the low impedance output is enabled to drive the slave select line to the second voltage state when the high impedance output is attempting to drive the slave select line to the first voltage state. The slave device 404 may be adapted to assert the first voltage state on the slave select line when occupancy of the receive buffer falls below the threshold occupancy level, after having asserted the second voltage state on the slave select line when the occupancy of the receive buffer rose above the threshold occupancy level. The slave device 404 may include a flow control decision circuit 520 configured to monitor occupancy of the receive buffer, monitor voltage state of the slave select line, and cause a line driver circuit to assert the second voltage state on the slave select line when the voltage state of the slave select line is at the first voltage state and the occupancy is at a level that equals or exceeds a threshold occupancy level. The flow control decision circuit 520 may be configured to cause the line driver circuit to return the slave select line to the first voltage state after causing the line driver circuit to assert the second voltage state and after the occupancy falls to a level that is less than the threshold occupancy level.

In another example, a master device 402 may include modules or circuits adapted to assert a first voltage state on a slave select line of a serial peripheral interface bus 1012, modules or circuits adapted to transmit data and a clock signal over the serial peripheral interface bus 1012. The first voltage state may be asserted on the slave select line to initiate an exchange of data over one or more data lines of the serial peripheral interface bus 1012. The modules or circuits adapted to transmit the data and the clock signal may be configured to transmit the data from the master device 402 to the slave device 404 while the slave select line remains at the first voltage state, and refrain from transmitting the data from the master device 402 to the slave device 404 when the slave select line transitions to a second voltage state from the first voltage state. The slave device 404 may be configured to receive the data into a receive buffer while the slave select line remains at the first voltage state and assert the second voltage state on the slave select line when occupancy of the receive buffer reaches or exceeds a threshold occupancy level.

The master device 402 may include a first driver circuit configured to drive the slave select line to the first voltage state using a high impedance output, and the slave device 404 may include a second driver circuit configured to drive the slave select line to the first voltage state using a low impedance output. Impedances of the first driver circuit and the second driver circuit may be selected such that the low impedance output is enabled to drive the slave select line to the second voltage state when the high impedance output is attempting to drive the slave select line to the first voltage state.

The modules or circuits adapted to assert the first voltage state on the slave select line may be configured to cause a line driver of the master device 402 to drive the slave select line toward the first voltage state, and cause the line driver of the master device 402 to enter an open-circuited mode of operation when the slave select line achieves the first voltage state. The master device 402 may have or be coupled to a keeper circuit 528 configured to maintain signaling state of the slave select line after the line driver has entered the open-circuited mode of operation.

The slave device 404 may be configured to monitor occupancy of the receive buffer at the slave device 404, monitor voltage state of the slave select line, and drive the slave select line to the second voltage state when the voltage state of the slave select line is at the first voltage state and the occupancy is at a level that equals or exceeds a threshold occupancy level.

The modules or circuits adapted to assert the first voltage state on the slave select line may be configured to return the slave select line to the first voltage state after the slave device 404 ceases driving the slave select line.

In another example, a slave device 404 coupled to a serial peripheral interface bus 1012 a receiving circuit coupled to a slave select line of the serial peripheral interface bus 1012, a line driver configured to selectively drive the slave select line of a serial peripheral interface bus 1012 with low impedance, a receive buffer configured to receive data from the serial peripheral interface bus 1012, and flow control logic. The flow control logic may be included in a flow control decision circuit 520, for example. The flow control logic may be configured to monitor an output of the receiving circuit to determine when the slave device 404 is selected for communicating over the serial peripheral interface bus 1012, monitor occupancy of the receive buffer at the slave device 404, and cause the line driver to drive the slave select line to a second voltage level when the slave device 404 is selected for communicating and the occupancy of the receive buffer is at a level that equals or exceeds a threshold occupancy level. The slave device 404 may be selected for communicating when the slave select line is at a first voltage level.

The flow control logic may be configured to cause the slave select line to return to the first voltage level after the occupancy of the receive buffer falls to a level that is less than the threshold occupancy level. The line driver may be configured to drive the slave select line to the second voltage level with an output impedance that is lower than an output impedance of a driver used by a master device 402 to drive the slave select line to the first voltage state. The flow control logic may be configured to configure the line driver to drive the slave select line with a low impedance when occupancy of the receive buffer is at a level that is less than the threshold occupancy level, and configure the line driver to enter an open-circuited mode of operation when occupancy of the receive buffer is at a level that is less than the threshold occupancy level. The flow control logic may be configured to cause the line driver to drive the slave select line to the first voltage level before entering the open-circuited mode of operation. A keeper circuit 528 may be configured to maintain signaling state of the slave select line after the line driver has entered the open-circuited mode of operation.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. An apparatus, comprising:
   a serial peripheral interface bus;
   a master device coupled to the serial peripheral interface bus and adapted to:
      assert a first voltage state on a slave select line to initiate an exchange of data over one or more data lines of the serial peripheral interface bus;
      while the slave select line remains at the first voltage state, transmit a clock signal over a clock line of the serial peripheral interface bus, wherein the exchange of data is synchronized with the clock signal; and
      while the slave select line is at a second voltage state, refrain from transmitting data over the one or more data lines; and
   a slave device coupled to the serial peripheral interface bus, wherein the slave device has a receive buffer and is adapted to:
      receive data into the receive buffer while the slave select line remains at the first voltage state; and
      assert the second voltage state on the slave select line when occupancy of the receive buffer reaches or exceeds a threshold occupancy level,
   wherein the master device comprises a first driver circuit configured to drive the slave select line to the first voltage state using a high impedance output, and the slave device comprises a second driver circuit configured to drive the slave select line to the first voltage state using a low impedance output.

2. The apparatus of claim 1, wherein impedances of the first driver circuit and the second driver circuit are selected such that the low impedance output is enabled to drive the slave select line to the second voltage state when the high impedance output is attempting to drive the slave select line to the first voltage state.

3. The apparatus of claim 1, wherein the master device is adapted to assert the first voltage state by:
   causing a line driver to drive the slave select line toward the first voltage state; and
   causing the line driver to enter an open-circuited mode of operation when the slave select line achieves the first voltage state.

4. The apparatus of claim 3, wherein the master device comprises:
   a keeper circuit configured to maintain signaling state of the slave select line after the line driver has entered the open-circuited mode of operation.

5. The apparatus of claim 1, wherein the slave device is adapted to:
   after asserting the second voltage state on the slave select line, assert the first voltage state on the slave select line when the occupancy of the receive buffer falls below the threshold occupancy level.

6. The apparatus of claim 1, wherein the slave device comprises a flow control decision circuit configured to:
   monitor the occupancy of the receive buffer;
   monitor voltage state of the slave select line; and
   cause a line driver circuit to assert the second voltage state on the slave select line when the voltage state of the slave select line is at the first voltage state and the occupancy of the receive buffer is at a level that equals or exceeds the threshold occupancy level.

7. The apparatus of claim 6, wherein the flow control decision circuit is configured to:
   cause the line driver circuit to return the slave select line to the first voltage state after causing the line driver circuit to assert the second voltage state and after the occupancy of the receive buffer falls to a level that is less than the threshold occupancy level.

8. A method for transmitting information using a serial peripheral interface bus, comprising:
  at a master device, initiating an exchange of data over one or more data lines of the serial peripheral interface bus by asserting a first voltage state on a slave select line;
  transmitting data and a clock signal from the master device over the serial peripheral interface bus while the slave select line remains at the first voltage state;
  refraining from transmitting the data and the clock signal from the master device over the serial peripheral interface bus when the slave select line transitions to a second voltage state from the first voltage state;
  receiving the data at a slave device into a receive buffer while the slave select line remains at the first voltage state; and
  asserting, by the slave device, the second voltage state on the slave select line when occupancy of the receive buffer reaches or exceeds a threshold occupancy level,
  wherein the master device comprises a first driver circuit configured to drive the slave select line to the first voltage state using a high impedance output, and the slave device comprises a second driver circuit configured to drive the slave select line to the first voltage state using a low impedance output.

9. The method of claim 8, wherein impedances of the first driver circuit and the second driver circuit are selected such that the low impedance output is enabled to drive the slave select line to the second voltage state when the high impedance output is attempting to drive the slave select line to the first voltage state.

10. The method of claim 8, wherein asserting the first voltage state on the slave select line includes:
  causing a line driver of the master device to drive the slave select line toward the first voltage state; and
  causing the line driver of the master device to enter an open-circuited mode of operation when the slave select line achieves the first voltage state.

11. The method of claim 10, wherein the master device comprises:
  a keeper circuit configured to maintain signaling state of the slave select line after the line driver has entered the open-circuited mode of operation.

12. The method of claim 8, further comprising:
  using a line driver of the slave device to assert the first voltage state on the slave select line when the occupancy of the receive buffer falls below the threshold occupancy level after the slave device has asserted the second voltage state on the slave select line.

13. The method of claim 8, further comprising:
  monitoring the occupancy of the receive buffer at the slave device;
  monitoring voltage state of the slave select line; and
  causing a line driver circuit of the slave device to drive the slave select line to the second voltage state when the voltage state of the slave select line is at the first voltage state and the occupancy of the receive buffer is at a level that equals or exceeds the threshold occupancy level.

14. The method of claim 13, further comprising:
  returning the slave select line to the first voltage state after causing the line driver circuit to assert the second voltage state and after the occupancy of the receive buffer falls to a level that is less than the threshold occupancy level.

15. An apparatus, comprising:
  means for asserting a first voltage state on a slave select line of a serial peripheral interface bus, wherein the first voltage state is asserted on the slave select line to initiate an exchange of data over one or more data lines of the serial peripheral interface bus; and
  means for transmitting data and a clock signal over the serial peripheral interface bus, the means for transmitting the data and the clock signal being configured to:
    transmit the data to a slave device while the slave select line remains at the first voltage state; and
    refrain from transmitting the data from the master device to the slave device when the slave select line transitions to a second voltage state from the first voltage state,
  wherein the slave device is configured to receive the data into a receive buffer while the slave select line remains at the first voltage state and assert the second voltage state on the slave select line when occupancy of the receive buffer reaches or exceeds a threshold occupancy level and wherein the means for asserting comprises a first driver circuit configured to drive the slave select line to the first voltage state using a high impedance output, and the slave device comprises a second driver circuit configured to drive the slave select line to the first voltage state using a low impedance output.

16. The apparatus of claim 15, wherein impedances of the first driver circuit and the second driver circuit are selected such that the low impedance output is enabled to drive the slave select line to the second voltage state when the high impedance output is attempting to drive the slave select line to the first voltage state.

17. The apparatus of claim 15, wherein the means for asserting the first voltage state on the slave select line is configured to:
  cause a line driver of the means for asserting to drive the slave select line toward the first voltage state; and
  cause the line driver of the means for asserting to enter an open-circuited mode of operation when the slave select line achieves the first voltage state.

18. The apparatus of claim 17, wherein the means for asserting comprises:
  a keeper circuit configured to maintain signaling state of the slave select line after the line driver has entered the open-circuited mode of operation.

19. The apparatus of claim 15, wherein the slave device is configured to:
  monitor the occupancy of the receive buffer at the slave device;
  monitor voltage state of the slave select line; and
  drive the slave select line to the second voltage state when the voltage state of the slave select line is at the first voltage state and the occupancy of the receive buffer is at a level that equals or exceeds the threshold occupancy level.

20. The apparatus of claim 19, wherein the means for asserting the first voltage state on the slave select line is configured to:
  return the slave select line to the first voltage state after the slave device ceases driving the slave select line.

21. A slave device coupled to a serial peripheral interface, comprising:
  a receiving circuit coupled to a slave select line of the serial peripheral interface;
  a line driver configured to selectively drive the slave select line of the serial peripheral interface with low impedance;
  a receive buffer configured to receive data from the serial peripheral interface; and
  flow control logic configured to:

monitor an output of the receiving circuit to determine when the slave device is selected for communicating over the serial peripheral interface, wherein the slave device is selected for communicating when the slave select line is at a first voltage level;

monitor occupancy of the receive buffer at the slave device; and cause the line driver to drive the slave select line to a second voltage level when the slave device is selected for communicating and the occupancy of the receive buffer is at a level that equals or exceeds a threshold occupancy level.

22. The slave device of claim 21, wherein the flow control logic is configured to:

cause the slave select line to return to the first voltage level after the occupancy of the receive buffer falls to a level that is less than the threshold occupancy level.

23. The slave device of claim 21, wherein:

the line driver is configured to drive the slave select line to the second voltage level with an output impedance that is lower than an output impedance of a driver used by a master device to drive the slave select line to the first voltage level.

24. The slave device of claim 21, wherein the flow control logic is configured to:

configure the line driver to drive the slave select line with a low impedance when the occupancy of the receive buffer is at a level that is less than the threshold occupancy level; and configure the line driver to enter an open-circuited mode of operation when the occupancy of the receive buffer is at a level that is less than the threshold occupancy level.

25. The slave device of claim 24, wherein the flow control logic is configured to:

cause the line driver to drive the slave select line to the first voltage level before entering the open-circuited mode of operation.

26. The slave device of claim 24, wherein a keeper circuit is configured to maintain signaling state of the slave select line after the line driver has entered the open-circuited mode of operation.

* * * * *